US005507925A

United States Patent [19]
Brew

[11] Patent Number: 5,507,925
[45] Date of Patent: Apr. 16, 1996

[54] ELECTROCHEMICAL DRILLING OF SUBSTRATES

[75] Inventor: Thomas W. Brew, Corning, N.Y.

[73] Assignee: Corning Incorporated, Corning, N.Y.

[21] Appl. No.: 331,178

[22] Filed: Oct. 28, 1994

[51] Int. Cl.$^6$ ............................................. B23H 9/14
[52] U.S. Cl. ....................... 205/660; 204/224 M; 205/665
[58] Field of Search ........................... 204/129.55, 224 M

[56] References Cited

U.S. PATENT DOCUMENTS

| | | | |
|---|---|---|---|
| 3,719,579 | 3/1973 | Cross et al. | 204/129.55 X |
| 3,748,428 | 7/1973 | Nichols, Jr. | 204/129.55 X |
| 4,459,190 | 7/1984 | Inoue | 204/129.55 X |
| 4,687,563 | 8/1987 | Hayes | 204/224 |
| 5,306,401 | 4/1994 | Fierkens et al. | 204/129.55 X |
| 5,320,721 | 6/1994 | Peters | 204/129.1 |
| 5,322,599 | 6/1994 | Peters | 204/129.2 |

FOREIGN PATENT DOCUMENTS 0245545  11/1987  European Pat. Off. .......... B23H 7/26

Primary Examiner—Donald R. Valentine
Attorney, Agent, or Firm—Kees van der Sterre

[57] ABSTRACT

A process is set forth for electrochemically machining holes in a workpiece, such as a die, in such a manner so as to virtually eliminate surface finish patterns normally introduced by the electrochemical machining process, by randomly forming sequences of patterns of holes extending in rows across the workpiece along its extent, and then rotating the workpiece 180° and randomly forming additional sequences of patterns of holes across the workpiece adjacent those sequences of holes which were formed prior to rotating the workpiece 180°.

12 Claims, 4 Drawing Sheets

ELECTROCHEMICAL DRILLING OF SUBSTRATES

FIELD OF THE INVENTION

The present invention relates to electrochemical machining, and in particular to an improved method of electrochemically drilling holes in a substrate so as to significantly reduce or virtually eliminate surface finish patterns induced by the electrochemical machining process.

BACKGROUND OF THE INVENTION

In recent years, extruded ceramic materials have been increasingly used as substrates for automotive catalytic converter products. During the course of there manufacture, these extruded ceramic substrates are forced through highly precise extrusion dies which are formed of ultra-hard materials.

The manufacture of extrusion dies from these ultra hard materials is an extremely precise process. The extrusion dies are formed with multiple apertures through which material to be extruded is forced under high pressure. In one method of forming the extrusion die, mechanical drills are used to provide the extrusion apertures. If the extrusion dies are formed of ultra-hard materials such as, for example, 17-4PH stainless steel or Inconel® 718 (a registered trademark of International Nickel Co., Inc.), the drilling rate used for aperture formation is very slow and a great deal of time and effort is expended in extrusion die formation. If softer die materials are used, the drilling rate is increased, but the life span of the resulting extrusion die is correspondingly shorter.

Because of these difficulties, apertures are now formed in extrusion dies by electrochemical machining techniques rather than by mechanical drilling. With an electrochemical machining process, the workpiece from which the die is to be formed is situated in a horizontally indexable but vertically fixed position relative to a vertically moveable drilling rig manifold. The manifold supports a plurality of drilling tubes, each of which is utilized to form an aperture in the workpiece. The drilling tubes operate as cathodes in the electrochemical machining process, while the workpiece comprises the anode. As the workpiece is flooded with an acid electrolyte from the drilling tubes, material is selectively deplated from the workpiece in the vicinity of the drilling tubes to form the requisite aperture pattern. U.S. Pat. No. 4,687,563 to Hayes, U.S. Pat. No. 5,320,721 to Peters, U.S. Pat. No. 5,322,599 to Peters, and European Patent Application, Publication No. 0245 545 to Peters disclose such processes. Although this production technique has found significant usefulness in the art, the resulting extrusion dies may have a variability in surface finish patterns across the die which can lead to extrusion problems such as bow or band. The present invention is directed to overcoming these deficiencies.

SUMMARY OF THE INVENTION

The present invention relates to a process for electrolytic drilling of holes in workpieces, particularly those workpieces of ultra-hard materials. The process involves randomly drilling by an electrochemical machining process, rows or patterns of feed holes which extend across a die blank, along its extent, rotating the die blank 180°, and then randomly electrochemically drilling additional rows or patterns of feed holes between the initially drilled rows of feed holes. The sequence of drilling such rows of holes is such that the holes formed in adjacent ends of adjacent rows are drilled with drilling tubes from an opposite end of the drilling rig. The alternating sequence of rows and the randomization of such sequences results in the virtual elimination of undesirable patterns being formed in the drilled workpiece.

DETAILED DESCRIPTION OF THE PREFERRED EMBODIMENTS

Figure 1:
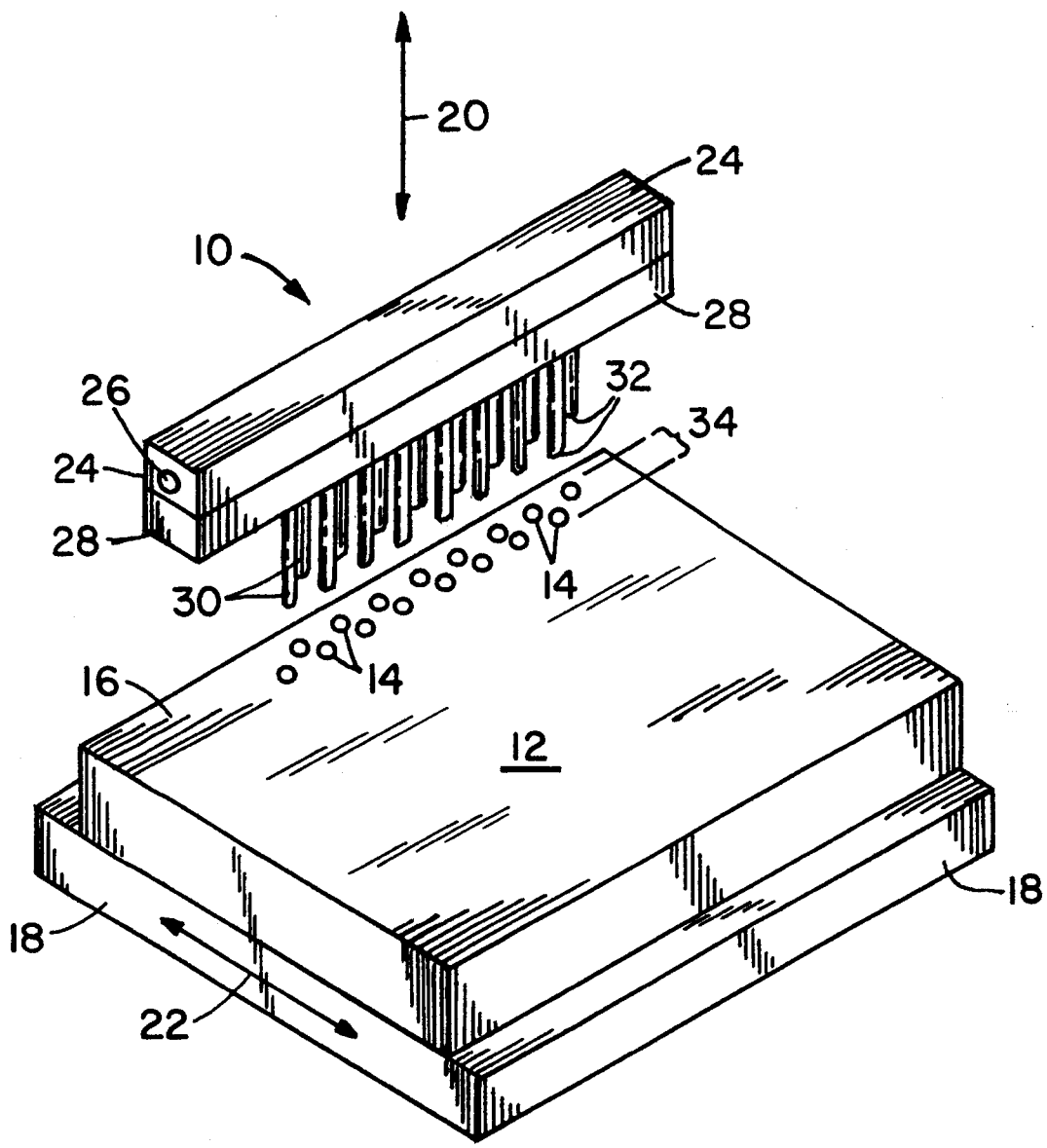
FIG. 1 is a somewhat schematic perspective view of portions of an electrochemical drilling machine utilized in the present invention.

Referring now to the drawings, and particularly FIG. 1, a portion of an electrochemical milling machine 10 is shown which operates on a workpiece or die blank 12 to form apertures or holes 14 in an upper surface 16 of a die. Although the present invention is not so limited, the invention has particular utility in the formation of extrusion dies for the extrusion of ceramic substrates utilized in automotive catalytic converter applications. In such applications, the workpiece 12 to be formed into an extrusion die is comprised of ultra-hard materials such as, for example, stainless steel or Inconel®.

The workpiece or die blank 12 as shown in FIG. 1 has an upper surface 16 and a lower surface which is coupled to a base member or workholder 18. The base member 18 is vertically fixed relative to the vertically moveable portions of the electrochemical milling machine 10, but is programmably moveable along arrow 22 for positioning sequences of rows of apertures 14 within the die blank 12.

The electrochemical milling machine 10 includes a drilling rig or manifold 24 which is moveable in a vertical direction with respect to the workpiece 12, as represented by arrow 20. The movement of the manifold 24 with respect to the workpiece 12 is controlled by any suitable means such as a feed rod in the form of a driven lead screw. A liquid electrolyte port 26 is formed at one end of the manifold 24 for supplying liquid electrolyte to the manifold. A lower block portion 28 supportably clamps a plurality of drilling tubes 30 in operative engagement with the manifold 24. The liquid electrolyte from the liquid electrolyte port 26 is distributed to the plurality of drilling tubes 30. The drilling tubes 30 operate as cathodes in the electrochemical machining process, whereas the workpiece 12 operates as an anode in such process.

In operation of the apparatus 10, electrolyte is supplied under pressure through the electrolyte inlet port 26, into the manifold 24, and hence into the plurality of drilling tubes 30 from which the electrolyte is expelled from the outlet ends 32 thereof. A suitable power supply maintains a potential difference between the drilling tube electrodes 30 and the workpiece 12. Further, the drilling tubes 30 are advanced along arrow 20 toward the workpiece 12 while the electrolyte is passed through the drilling tubes 30 and out through their outlet ends 32 into contact with the workpiece 12, while passing a fixed electric current between the tubes and the workpiece through the electrolyte. The constant current flow through the drilling tubes 30, the electrolyte fluid, and the workpiece 12, causes conductive material from the workpiece to deplate uniformly throughout the holes 14 formed thereby.

Figure 2:
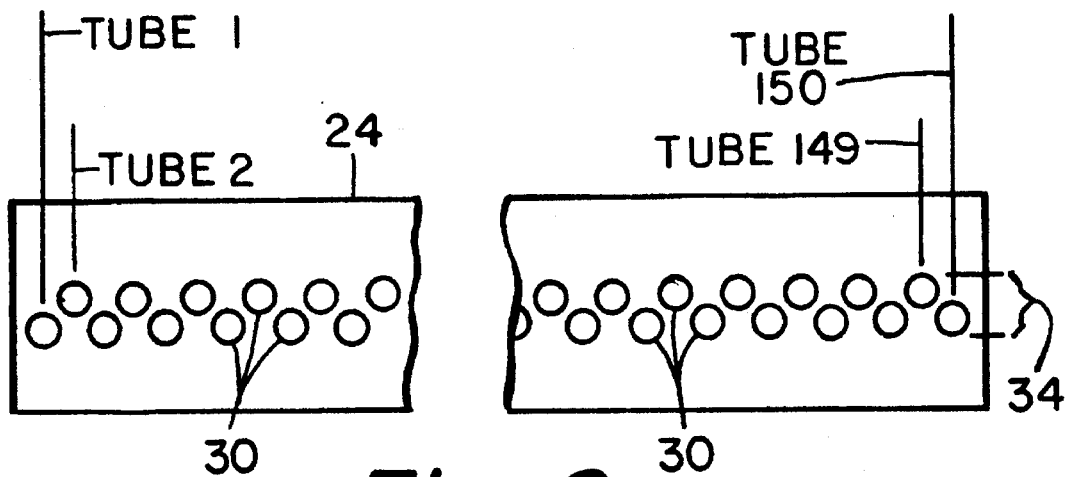
FIG. 2 is a fragmental schematic representation of a staggered row pattern or sequence of drilling tubes extending across the bottom of a drilling rig manifold, which may be utilized with the present invention.

A representative electrochemical machining process (ECM) utilized today to drill feed holes in a die involves the use of a drilling rig having a manifold assembly 24 comprised of a row or pattern 34 of approximately 150 tubes 30. Although the row or pattern 34 shown in FIG. 2 is comprised of drilling tubes for forming an offset array or dual row pattern 34, not only may the number of tubes utilized vary, depending upon the size of the die to be formed, but also various row patterns or arrays may be utilized including single rows, multiple aligned rows, and multiple staggered rows as desired. Thus, the term row is used herein to include all such variations.

The drilling rig including a manifold assembly 24 is programmed to relatively step sequentially across the die blank 12 along arrow 22 for drilling a sequence of holes 14 within the die blank 12 via the electrochemical machining process. Preferably the workholder 18 is programmed to move in a random sequence along arrow 22 under a horizontally stationary manifold assembly 24 to form such holes. The ECM process is complex and involves many variables which can effect hole quality, including a hole's surface finish. Surface finish variability may be mechanically induced, such as by tube diameter differences, tube alignment differences and tube clamping differences, or the variability can be process induced including temperature differences, pressure differences or electrical differences such as voltage/current over time. Such differences in the surface finish have a tendency during the repetition of the drilling process to produce surface finish patterns across the die face. Thus, any variability in the surface finish in the die or surface finish patterns across the die can lead to extrusion problems such as bow, wherein there is a tendency for the extrudate to curve upon leaving the extruder, or band wherein a defect is produced in the ware due to single line patterns produced in the die.

Figure 3:
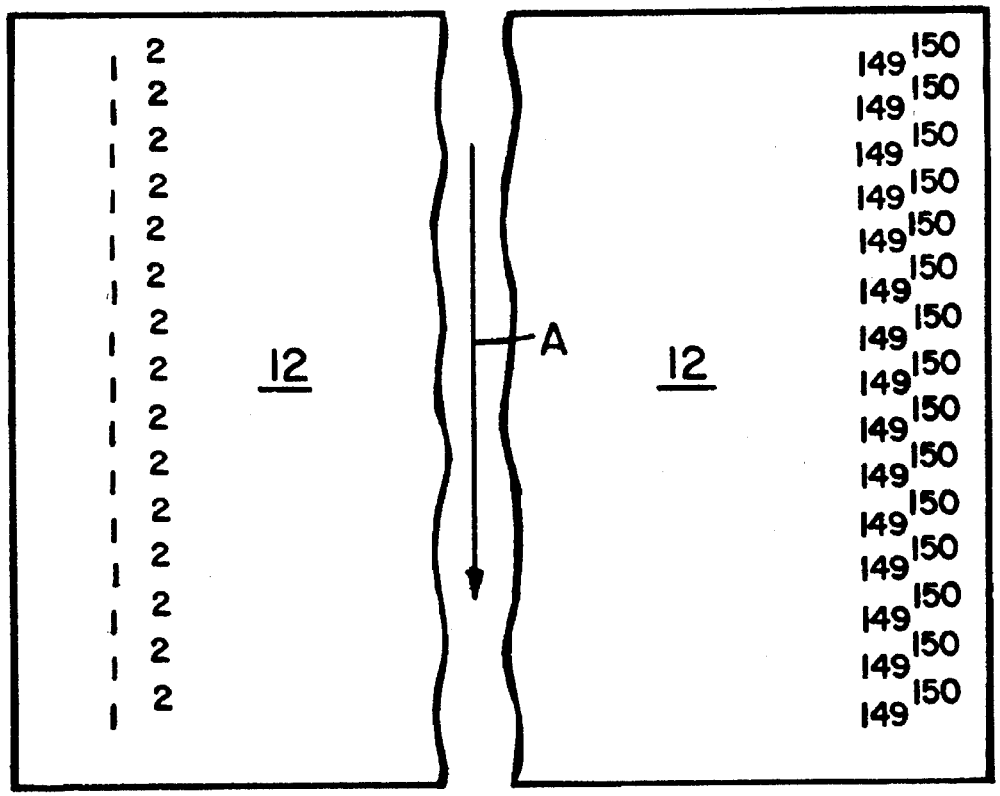
FIG. 3 is a fragmental schematic plan view of a die illustrating a hole pattern formed along the length of a die blank of rows of holes extending across the die blank, wherein the rows of holes are formed sequentially from one end of the die to the other.

The problem of surface finish patterns is exacerbated as the rows 34 of hole patterns 14 are formed in the die blank 12, sequentially one row after another along the die as shown by arrow A in FIG. 3. As shown, in FIG. 3, tubes numbers 1 and 2 will always form holes numbers 1 and 2 on the left side of the die 12, whereas tubes numbers 149 and 150 will always forms holes 149 and 150 along the right side of the die 12. Thus, any variation in the surface finish of the holes 14 produced in the die blank 12 by the drilling tubes 1–150 within the row pattern 34 will be repeated during each drilling sequence, thus producing a variability in surface finish patterns across the die, which patterns then extend along the length of the die as each sequence of holes is drilled.

Figure 4:
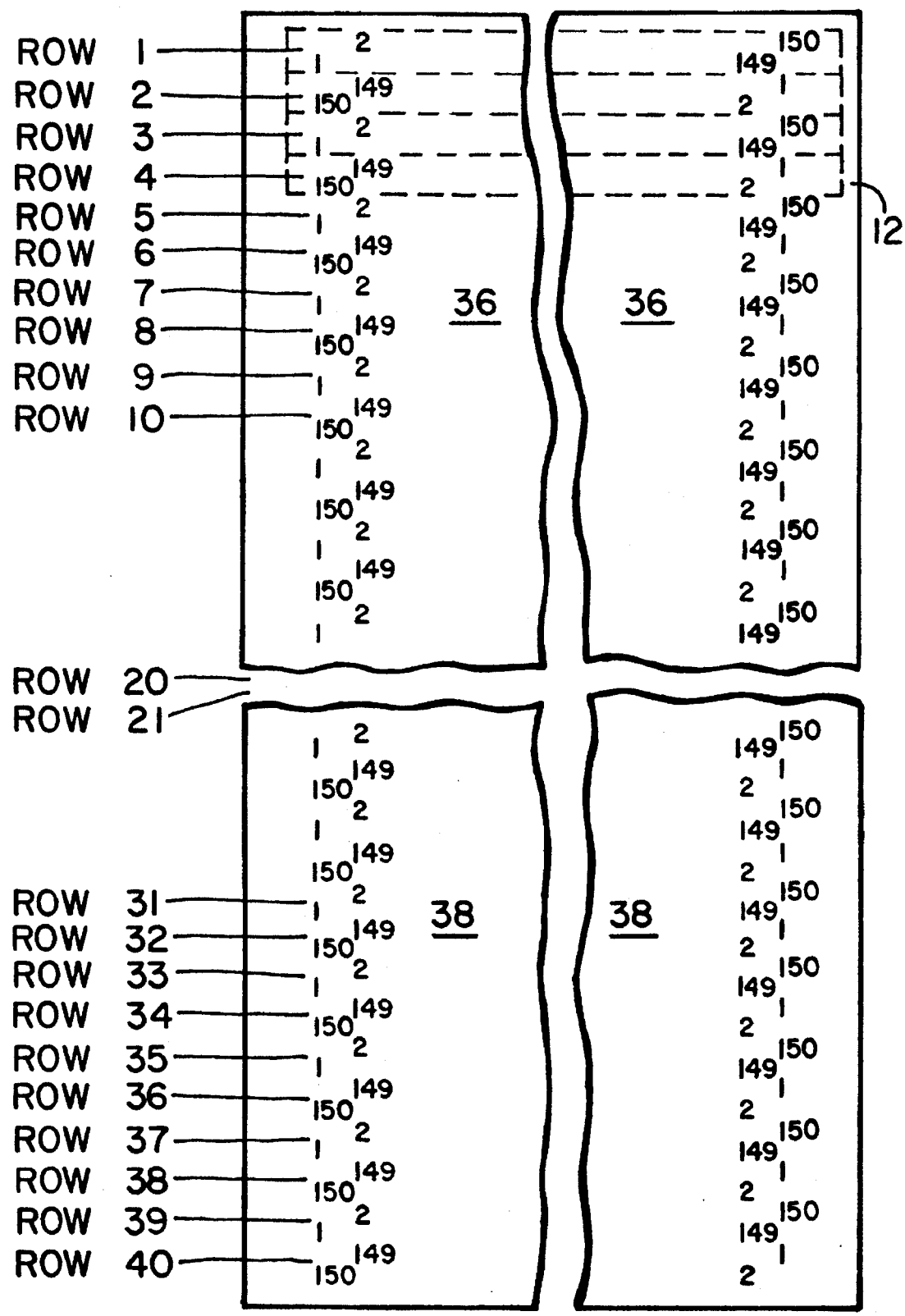
FIG. 4 is a fragmental schematic plan view of a die illustrating a hole pattern formed along the length of a die blank by rows of holes, wherein the rows are not only randomly formed along the length of the die blank, but adjacent rows of such holes are formed such that the ends thereof alternate with one another.

In order to alleviate the problems of surface finish patterns produced within a die blank by electrochemical machining, a new and improved drilling process was defined. In a preferred embodiment, the process involves the randomly drilling of half of the required number of feedhole rows in a die blank, such as all of the odd numbered sequences, then rotating the die blank 180°, and then randomly completing the drilling of the feedhole rows, such as all even numbered sequences. Thus, as shown in FIG. 4, the drilling sequences are laid out so that adjacent ends of adjacent row patterns are drilled with the tubes 30 from the opposite end of the drilling rig or manifold assembly 24. As further shown in FIG. 4, holes numbers 1 and 2 would alternate with holes numbers 150 and 149 on the left side of the die, whereas holes numbers 149 and 150 would alternate with holes numbers 2 and 1 on the right side of the die. The randomization of forming the various rows or patterns 34 along the length of the die blank 12 insures that the time effects from the electrochemical machining process do not build a pattern into the die, whereas the alternate ends of the drilling rig or manifold assembly 24 forming adjacent rows or patterns 34 has the effect of significantly reducing or virtually eliminating surface finish patterns in the die.

Although the preferred embodiment sets forth the step of initially drilling half of the required rows of feed holes 14 and then rotating the die 180° to complete the drilling of the remaining rows of feed holes, the initial drilling process of rows may be less than half of the total required, and upon rotating the die 180°, not all of the remaining alternate rows need be completed at that time, since, if desired, the die blank may be rotated 180° several times to further randomize the drilling process.

The randomization of drilling the various rows 34 may take on any desired sequence such as from a table of random numbers. Further, if desired, the various rows or patterns 34 of holes 14 to be formed in the die blank, may be formed by mathematically dividing the die in halves, including a first half 36 and a second half 38. A first sequence would form a row of holes in the first half of the die, then the next sequence would form a row of holes in the second half of the die, and the next sequence would form a row of holes back in the first half of the die. This procedure would be followed until half of the desired number of rows of holes are formed, and then the die rotated 180° and the rows again randomly formed between those already formed before rotating the die, such that one row is formed in one half of the die and the next drilling sequence would form a row in the other half of the die.

For example, if a die 12 were to require 40 rows of holes 14 formed therein, such as shown in FIG. 4, a first half of the die 36 would include rows 1 through 20 and the second half of the die 38 would include rows 21 through 40. Since alternate rows are initially formed in the die, and then the die rotated 180° to form the remaining rows, one possibility of the first ten drilling sequences of row forming could be row 1, row 39, row 15, row 33, row 7, row 25, row 13, row 27, row 5 and row 31. It is understood that an additional 10 drilling sequences would be performed to finish all of the odd desired rows. The die would then be rotated 180° and the remaining rows randomly formed. The final drilling sequences of 31 through 40 could include row 6, row 38, row 18, row 24, row 2, row 36, row 12, row 28, row 14 and row 22.

Figure 5:
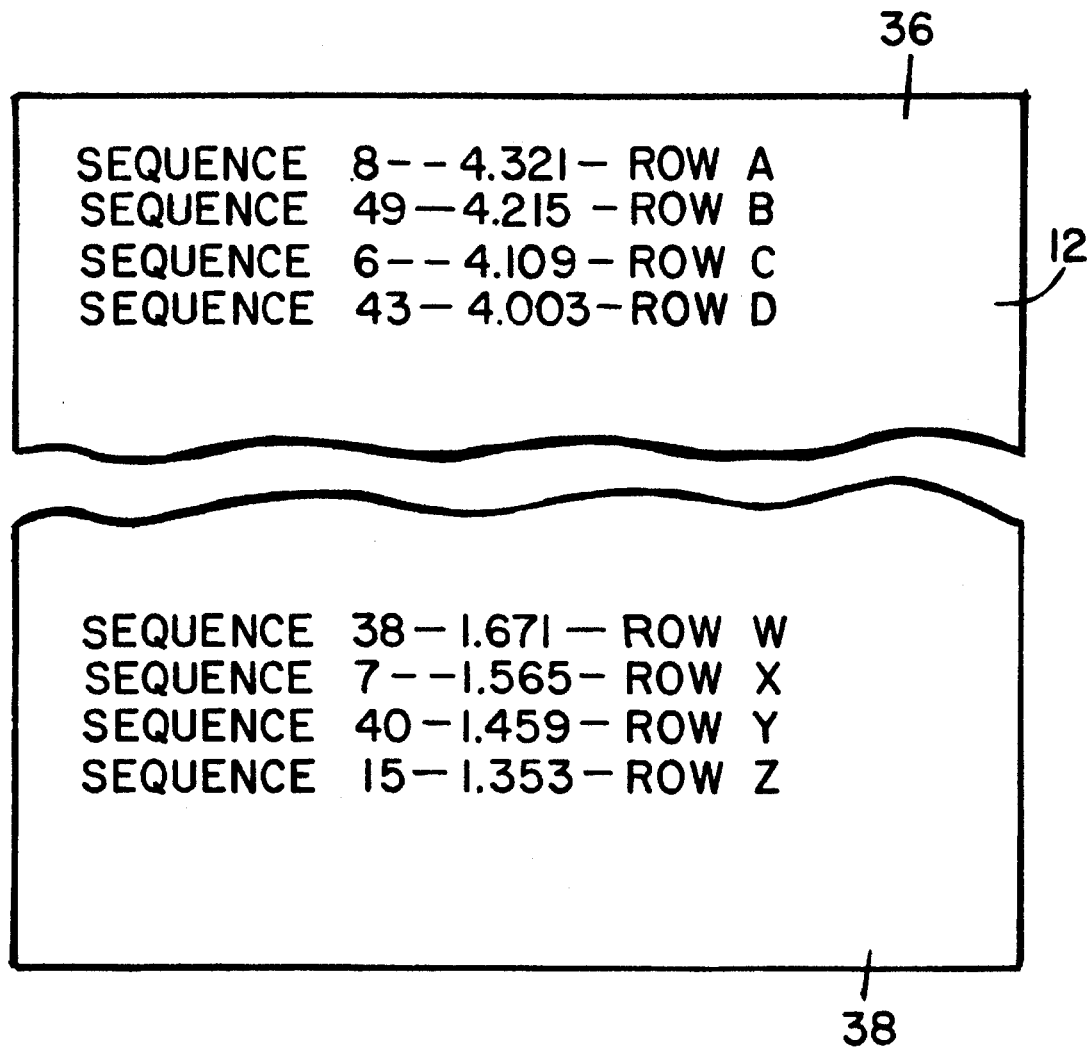
FIG. 5 is a schematic plan view of a die illustrating the sequence of formation and positionment of adjacent rows in first and second halves of the die.

FIG. 5 illustrates the actual positionment of four adjacent rows in a first half 36 of a die 12 showing the sequence in which they were formed, and four adjacent rows in a second half 38 of the die 12, also showing the sequence in which they were formed, together with their actual numerical positionment with respect to a fixed reference. Of the drilling sequences shown in FIG. 5, row C was the first to be drilled across the first half 36 of the die at a position 4.109 relative to a reference, whereas row X was the next row to be formed in the second half 38 of the die 12 at a position of 1.565 from the fixed reference. The next row to be formed was row A in the first half 36 of the die at a position of 4.321 from said reference. Then numerous other sequences were drilled but not shown in FIG. 5, with the next sequence shown in FIG. 5 being row Z in the bottom or second half 38 of the die 12 at a positionment of 1.353 from the reference point. The remaining rows W, Y, D and B were formed during drilling sequences 38, 40, 43 and 49 respectively.

Before beginning the random drilling sequences within the desired operable portion of the die blank, it may be desirable to drill one or more qualifying rows of holes in the die blank, but outside of the desired usable portion, in order to set the desired parameters of the drilling process so that the holes formed thereby have the desired diameter and surface finish. As a specific example, a stainless steel die blank having a width of 8 inches thereacross and a length of 6.75 inches may initially have several qualifying rows electrochemically drilled therein outside of the desired operating die portion, in order to better define and set the desired drilling parameters necessary to produce the desired holes. A drilling sequence of rows or patterns of holes across the die is then commenced such as shown in Table I.

The locations identified in Table I are from a predetermined reference. It will be noted from the location, that each drilling sequence alternates with the next sequence between an upper or first half of the die blank and a lower or second half of the die blank. Further, after the 24th sequence the die blank is rotated 180°, and the remaining 24 sequences are drilled. Here again, it will be noted from the location that each successive sequence alternates between a first half and a second half of the die blank. Each drilling sequence performed in the first half of the drilling operation may be in the form of a staggered row, multiple staggered rows, a single row or multiple aligned rows such that a pattern of holes or apertures are formed across a portion of the die blank. Each pattern or array of holes formed by a drilling sequence is identical with each sequence drilled with the die oriented in one direction, whereas the pattern of holes formed after the die is rotated 180° are identical with each other. Although not readily apparent from Table I, the rows drilled by sequences 25–48, formed after the die is rotated 180°, are positioned adjacent and between the rows drilled by sequences 1–24 which were formed prior to the die blank being rotated 180°.

In forming the patterns or arrays of holes within the die, using a fast feed rate of 0.04 inches per minute, the process for each drilled sequence preferably incorporates a forward voltage during the drilling process of 11 V, a reverse voltage of 0.5 V for flushing out debris, a forward current of 175 amps, a reverse current of 12 amps with a reverse time of 0.1 seconds. A drill rate of 0.04 inches per minute with a 66 psi electrolyte pressure produced an actual hole depth of 1.035 inches.

Although I have disclosed the now preferred embodiments of the invention, it will be apparent to those skilled in the art that various changes and modifications may be made thereto without departing from the spirit and scope thereof as defined in the appended claims.

TABLE I

| Sequence | Location |
| --- | --- |
| 1 | 4.109 |
| 2 | 1.565 |
| 3 | 4.321 |
| 4 | 0.293 |
| 5 | 3.685 |
| 6 | 0.717 |
| 7 | 4.957 |
| 8 | 1.141 |
| 9 | 3.473 |
| 10 | 1.353 |
| 11 | 3.261 |
| 12 | 1.989 |
| 13 | 4.745 |
| 14 | 1.777 |
| 15 | 4.533 |
| 16 | 2.413 |
| 17 | 1.837 |
| 18 | 0.929 |
| 19 | 3.897 |
| 20 | 2.201 |
| 21 | 3.049 |
| 22 | 0.505 |
| 23 | 0.081 |
| 24 | 5.169 |
| ROTATE DIE 180 DEGREES | |
| 25 | 4.427 |
| 26 | 1.247 |
| 27 | 3.579 |
| 28 | 0.611 |
| 29 | 3.791 |
| 30 | 0.399 |
| 31 | 2.943 |
| 32 | 1.671 |
| 33 | 3.155 |
| 34 | 1.459 |
| 35 | 4.851 |
| 36 | 1.035 |
| 37 | 4.003 |
| 38 | 1.883 |
| 39 | 4.639 |
| 40 | 0.823 |
| 41 | 2.731 |
| 42 | 2.519 |
| 43 | 4.215 |
| 44 | 0.187 |
| 45 | 3.367 |
| 46 | 2.307 |
| 47 | 5.063 |
| 48 | 2.095 |

I claim:

1. A method of electrochemically drilling feedholes in a die blank which comprises:

providing a die blank having a first half and a second half;

providing an electrochemical drilling rig having a plurality of drilling tubes which extend across a desired width of said die blank in a given row-like pattern;

randomly electrochemically drilling, along the length of the die blank, not more than half of the required number of row-like patterns of feedholes in the die blank;

relatively rotating the die blank 180° with respect to said drilling rig; and, randomly electrochemically drilling the remaining number of row-like patterns of feedholes in the die blank to complete the required number.

2. A method of drilling feedholes in a die blank as defined in claim 1 including the step of randomly electrochemically drilling half of the required feedholes in one of odd or even row-like patterns, and then after relatively rotating said die 180°, completing the electrochemical drilling of required feedholes in the other of said odd or even row-like pattern.

3. A method of drilling feedholes in a die blank as defined in claim 1 including the step of drilling said remaining number of row-like patterns of feed holes adjacent the row-like patterns of feedholes drilling prior to rotating said die blank.

4. A method of drilling feedholes in a die blank as defined in claim 1 including the step of alternating the forming of sequences of said row-like patterns between said first half and said second half of said die blank.

5. A method of electrochemically forming apertures in a workpiece comprising:

provoiding a workpiece to be electrochemically drilled;

electrochemically forming a desired row of apertures extending across a portion of said workpiece;

randomly forming sequences of said desired row of apertures along the length of said workpiece;

relatively rotating said workpiece 180° with respect to said desired row of apertures;

electrochemically forming a further row of apertures extending across a portion of said rotated workpiece; and randomly forming sequences of said further row of apertures along the length of said workpiece, at least some of said sequences of said further row of apertures being intermediate to said sequences of said desired row of apertures.

6. A method of electrochemically forming apertures in a workpiece as defined in claim 5 wherein each of the rows of said sequences of the desired row of apertures are formed with similar front ends and with similar back ends, and each of the rows of said sequences of the further row of apertures are formed with similar front ends and with similar back ends, and said various rows are formed such that front end of one of the desired and further rows is adjacent to the back end of the other of said rows.

7. A method of electrochemically forming apertures in a workpiece as defined in claim 6 including the step of forming the front end of one row similar to the back end of the next adjacent row.

8. A method of electrochemically forming apertures in a workpiece as defined in claim 5 including the steps of randomly forming said sequences of said desired row of apertures between a first half of said workpiece and a second half of said workpiece, and after relatively rotating said workpiece 180° randomly forming said sequences of said further row of apertures between the first half and second half of said workpiece.

9. A method of electrochemically forming apertures in a workpiece as defined in claim 8 including the step of alternating the forming of said random rows of apertures between said first and said second halves of said workpiece.

10. A method of repeatably electrochemically drilling a pattern of holes across a desired portion of a workpiece which comprises:

providing a workpiece to be electrochemically drilled, having a first half and a second half;

sequentially electrochemically drilling a desired pattern of holes across a desired portion of said workpiece, such that successive sequences of said hole patterns are randomly formed in alternate halves of said workpiece;

rotating said workpiece 180°, and;

sequentially electrochemically drilling a further pattern of holes across a desired portion of said workpiece, such that the successive sequences of said further hole patterns are randomly formed in alternate halves of said workpiece.

11. A method of electrochemically forming apertures in a workpiece comprising:

providing a workpiece to be electrochemically drilled;

electrochemically forming a desired row of apertures extending across a portion of said workpiece;

forming sequences of said desired row of apertures along the length of said workpiece;

relatively rotating said workpiece 180° with respect to said desired row of apertures;

electrochemically forming a further row of apertures extending across a portion of said rotated workpiece;

and forming sequences of said further row of apertures along the length of said workpiece;

wherein at least some of said sequences of said further row of apertures are intermediate to said sequences of said desired row of apertures and each of said sequences of said further row of apertures is formed adjacent a desired row of apertures formed prior to rotating said workpiece.

12. A method of repeatably electrochemically drilling a pattern of holes across a desired portion of a workpiece which comprises:

providing a workpiece to be electrochemically drilled, having a first half and a second half;

sequentially electrochemically drilling a desired pattern of holes across a desired portion of said workpiece, such that successive sequences of said hole patterns are formed in alternate halves of said workpiece;

rotating said workpiece 180°, and;

sequentially electrochemically drilling a desired pattern of holes across a desired portion of said workpiece, such that the successive sequences of said hole patterns are formed in alternate halves of said workpiece; wherein said pattern of holes drilled prior to the rotation of said workpiece is formed with an end portion which lies adjacent an opposite end portion of said pattern of holes drilled subsequent to said rotation of the workpiece.

* * * * *